US006637181B1

(12) United States Patent
Korte et al.

(10) Patent No.: US 6,637,181 B1
(45) Date of Patent: Oct. 28, 2003

(54) ELASTANE THREADS AND METHOD FOR THE PRODUCTION THEREOF

(75) Inventors: Siegfried Korte, Odenthal (DE); Rolf-Volker Meyer, Much (DE); Stefan Hütte, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/701,709

(22) PCT Filed: May 20, 1999

(86) PCT No.: PCT/EP99/03463

§ 371 (c)(1),
(2), (4) Date: Dec. 1, 2000

(87) PCT Pub. No.: WO99/63138

PCT Pub. Date: Dec. 9, 1999

(30) Foreign Application Priority Data

Jun. 2, 1998 (DE) ......................... 198 24 333

(51) Int. Cl.$^7$ ................................. D02G 3/02
(52) U.S. Cl. ............... 57/200; 264/177.19; 264/211.22; 264/211.23; 264/211.24; 264/177.13; 528/29; 528/83; 528/44; 525/474; 139/383 R; 442/304
(58) Field of Search ............... 264/177.13, 177.19, 264/211.22, 211.23, 211.24; 528/29, 83, 44; 525/474; 442/304; 139/383 R; 57/700

(56) References Cited

U.S. PATENT DOCUMENTS

| | | | |
|---|---|---|---|
| 3,509,238 A | 4/1970 | Aubrey et al. | 260/876 |
| 3,719,708 A | 3/1973 | Thoma et al. | 260/554 |
| 3,928,494 A | 12/1975 | Aliberti | 260/876 R |
| 5,118,780 A | * | 6/1992 | Hirai et al. |
| 5,565,270 A | 10/1996 | Rehbold et al. | 428/364 |

FOREIGN PATENT DOCUMENTS

| | | | |
|---|---|---|---|
| DE | 1 669 402 | 2/1971 | |
| DE | 28 32 352 | 1/1980 | F04C/15/00 |
| DE | 32 33 384 | 3/1984 | C08G/18/75 |
| EP | 0 256 470 | 2/1988 | C08G/18/32 |
| EP | 0 272 563 | 6/1988 | C08G/18/00 |
| EP | 0 397 121 | 11/1990 | C08G/18/66 |
| EP | 0 454 160 | 10/1991 | D01F/8/16 |
| EP | 0 460 973 A2 | 12/1991 | B05D/5/08 |
| EP | 0 535 908 A1 | 9/1992 | C08L/67/02 |
| EP | 0 634 445 A1 | 1/1995 | C08K/3/00 |
| EP | 679 738 | * 11/1995 | |
| JP | 09 078 348 | * 3/1997 | |

OTHER PUBLICATIONS

Textilpraxis International 36 (1981) p. 841.
Houben–Weyl "Methoden der organischen Chemie", vol. E 20, "Makromolekulare Stoffe", Georg Thieme Verlag, Stuttgart, New York, 1987, on pp. 1739 to 1748.
Kunststoff–Handbuch, vol. VII, edited by Oertel, Carl Hanser Verlag, Munich, 2$^{nd}$ edition, 1983, pp. 63–73.

* cited by examiner

Primary Examiner—Robert Dawson
Assistant Examiner—Kuo-Liang Peng
(74) Attorney, Agent, or Firm—Norris McLaughlin & Marcus

(57) ABSTRACT

Described is a process for producing segmented polyurethanes having improved processing characteristics in the melt state and an efficient spinning process based thereon to form highly elastic, fine linear density elastane yarn and filament having improved mechanical and thermal properties by using hydroxyalkyl-terminated polysiloxanes in combination with specific crosslinking-capable polyisocyanates in the reaction of long-chain high molecular weight polyhydroxy compounds with organic diisocyanates and low molecular weight diols and also optionally further auxiliary and additive substances in the melt.

16 Claims, No Drawings

ELASTANE THREADS AND METHOD FOR THE PRODUCTION THEREOF

This is a 371 of PCT/EP99/03463 filed May 20, 1999 (PCT filing date).

BACKGROUND OF THE INVENTION

The present invention relates to a process for producing segmented polyurethanes having improved processing characteristics in the melt state and an efficient spinning process based thereon to form highly elastic, fine linear density elastane yarn and filament having improved mechanical and thermal properties by using hydroxyalkyl-terminated polysiloxanes in combination with specific crosslinking-capable polyisocyanates in the reaction of long-chain high molecular weight polyhydroxy compounds with organic diisocyanates and low molecular weight diols and also optionally further auxiliary and additive substances in the melt. The invention also relates to the elastane yarn obtained from this process by direct spinning and after a thermal treatment.

Elastanes are mono- or multifil continuous yarns composed of at least 85% by weight of segmented poly (urethane)s or poly(urethaneurea)s. The fibre-forming polymers have a segmented structure; that is, they are composed of "crystalline" and "amorphous" blocks ("hard segments" and "soft segments"). The hard segments, owing to their "crystallinity", act as fixed points of the network and hence determine the strength of the shaped articles or fibres prepared from the polymers. By contrast, the soft segments, the glass transition temperature of which has to be below the use temperature, determine the elasticity of the elastanes.

Such elastanes are customarily prepared by polyaddition of long-chain dihydroxy compounds (macrodiols) with diisocyanates and low molecular weight dihydroxy or diamino compounds as chain extenders. High grade elastane filaments (also known as spandex) are prepared using poly (urethaneurea)s obtained by chain extension with diamines, since, compared with the diol-extended poly(urethane)s, they have (because of a larger number of hydrogen bonds between the polymer chains) a high hard-segment melting point on the one hand and excellent mechanical-elastic properties on the other. Elastane fibres are customarily produced by spinning solutions of these segmented poly (urethaneurea)s in highly polar solvents-such as dimethylformamide and dimethylacetamide by means of the so-called dry spinning process or the wet spinning process.

Because it does not require these relatively high boiling, aprotic solvents, a melt spinning process is preferable in principle to the aforementioned solution spinning processes for economic and ecological reasons. However, elastanes, for example from diamine-extended poly(urethaneurea)s, are not meltable without decomposition of the urea groups in the hard segments, as is discernible for example from Textilpraxis International 36, (1981) page 841. Thus, diamine-extended poly(urethaneurea)s are not spinnable from the melt. By contrast, the so-called thermoplastic poly(urethane)s having predominantly urethane hard segments which are obtained by chain extension with low molecular weight diols instead of diamines are spinnable into elastic yarn from the melt with a limited reduction in the molar mass. However, the use of such filaments is constrained by the fact that they (because of weaker binding interactions of their hard segments and the attendant lower softening temperature) do not withstand the thermal stresses arising in the course of the customary processing and treatment of elastanes. This applies in particular to the heat-settability of the elastic yarn for example in the course of the further processing with polyamide as hard fibre component into composite yarns at 195° C. So the processing of commercially available thermoplastic poly(urethane)s does not lead to useful filament or fabric.

To raise the thermal stability of elastic yarn composed of thermoplastic poly(urethane)s, it is necessary to improve the binding interactions between the macromolecules, especially between the hard segments of the molecular chains of the polymers.

In prior art processes, this is accomplished in a particularly advantageous manner by using in the solvent-free synthesis of the polyurethane not only the conventional difunctional isocyanates but also at least one more highly functional polyisocyanate, which preferably contains isocyanurate groups, and directly spinning the PU reaction melt without further intermediate steps.

The European patent application bearing the file reference 95 105 479.0 describes such a process which compared with other previously known processes—described for example in DE-32 33 384 A1, EP 0 256 470 A2, DE-OS 16 69 402, EP 0 454 160 A2 and EP 0 397 121 A2—makes it possible to produce melt-spun elastanes which have virtually comparable mechanical-elastic and thermal properties to poly (urethaneurea) elastanes spun conventionally from solution.

However, the process described in EP-A 95 105 479.0 is in need of further improvements. It is in particular the experimental details reported in the Examples which reveal that the process mentioned falls short of ensuring the technical certainty needed to produce elastanes in consistently good quality, the desired diversity of types and with sufficiently high spinning efficiency.

On the basis of the experiments described in EP-A 95 105 479.0, the preference is for spinning yarn within the linear density range of 70–160 dtex from single hole jets. The spinning speed, where it is disclosed at all, is comparatively low at 100–500 m/min. Technically advantageous processes of elastane production would have to meet significantly higher requirements not only in the case of solution spinning but also in the case of melt spinning. The spinning of plural ends (4–8 ends) is well known in the art. It involves plural hole jets being used to spin in particular fine linear density monofils (20–50 dtex) typically at a spinning speed of 600–1000 m/min.

Reproducing and testing the recipes recited in EP-A 95 105 479.0 pointed up some deficits. The spinnability of the polyurethanes produced is limited in the molten state. Jet lives are limited and the spinning of fine linear density yarn (20–50 dtex) is possible only for a short period, if at all, under a plural end process regime. Efficient spinning at speeds of >500 m/min is not consistently achievable.

The invention has for its object to provide a process for producing elastic PU yarns which, compared with existing processes, shall have the following advantages in particular:
1. Poly(urethane) preparation and spinning should take place without the addition of a solvent.
2. Poly(urethane) preparation and spinning should take place continuously with a very short delay or residence time of the melt. In particular, it should be possible whilst abstaining from isolating the polyurethane intermediate in granule form to minimize the thermal stress and hence the possible degradation of the polyurethane.
3. Synthesis of the elastane raw material should take place in such a way that yarn spinning and aftertreatment does not give rise to any cleavage products for example in the form of NCO-capping agents.

4. The melt produced from the ingredients should not contain any relatively highly crosslinked constituents in the form of gel-like particles and should have time-invariant rheological properties to ensure consistent processing by spinning, making it possible to produce fine linear density elastane yarn having good mechanical and thermal properties even at high spinning speed.

This object is achieved by the hereinbelow more particularly described process according to the invention.

SUMMARY OF THE INVENTION

It was surprisingly found that elastane yarns having the required good properties and the process-based advantages mentioned are obtainable on using in the solvent-free synthesis of the segmented polyurethanes not only macrodiols but also selected polysiloxanes having hydroxyalkyl end groups and not only difunctional isocyanate compounds but also at least one more highly functional polyisocyanate and, following addition of low molecular weight diols as chain extenders, producing a reaction product in the molten state and spinning it directly without further intermediate steps.

The use of the crosslinking more highly functional polyisocyanates in combination with incorporable polysiloxane compounds leads to reaction products in melt form which have an advantageous set of processing characteristics for direct spinning. Simultaneous use of the components mentioned gives rise to considerably fewer gel particles capable of severely impairing the spinning process and the fibre's quality especially in relation to the production of fine linear density yarn. The melt viscosity of the polyurethanes thus obtained can be lowered by using the polysiloxanes. As a consequence, melt spinning becomes controllable for a prolonged period. Pressure build-up across melt filtration means and pressure fluctuations in the region of the spinning jets are substantially ruled out.

DETAILED DESCRIPTION

The present invention accordingly provides a process for producing elastane yarn by reaction of:

(A) macrodiol mixtures consisting at least of preferably linear polyester-, polyether- and/or polycarbonate-diols having a molecular weight of 1000–8000 g/mol (number average), preferably of 1000–6000 g/mol, particularly preferably of 1500–4000 g/mol, and at least one hydroxyalkyl-terminated polysiloxane compound with (B) isocyanate mixtures consisting of diisocyanates and smaller fractions of preferably aliphatically structured polyisocyanates having an average NCO functionality of greater than 2, and (C) hydroxyalkyl-substituted diols having a molecular weight (number average) of up to 400 g/mol as chain extenders, alone or mixed, and optionally combined with low molecular weight polysiloxanes mentioned under (A) and optionally in the presence of (D) catalysts, stabilizers and further auxiliary and operational substances, spinning the resulting polyurethanes from the melt, spin finishing, drawing, relaxing then thermally aftertreating the yarn obtained, characterized in that the polyurethane synthesis is carried out using in the macrodiol mixture (A) at least one hydroxyalkyl-terminated polysiloxane compound having an OH functionality $\leq 2$ and a molecular weight of 300–6000 g/mol (number average) and the components of the macrodiol mixture (A) in such a mixing ratio that the number of the OH equivalents of the polysiloxane compounds relates to the number of the OH equivalents of the other macrodiols as 0.2:99.8 to 30:70, in that the components of the isocyanate mixture (B) are used in such amounts that the ratio of the isocyanate equivalents of the difunctional components to the higher functional components is within the range from 99.5:0.5 to 80:20, the reaction of the components (A), (B) and (C) is carried out continuously according to a one-step process or in two steps by the prepolymerization process with continuous chain extension reaction, the proportion of the components (B)+(C) in the elastic yarn, based on the sum total of the components (A)+(B)+(C), being in particular 5–30% by weight, and in that the resulting reaction melt is preferably spun directly, optionally in the presence of stabilizers and lubricants or other auxiliaries (D).

The statements of molecular weight relate, unless otherwise stated, to the number averages $M_n$ of the molecular weight.

It is decisive for the practice and control of the process of the invention that the macrodiol mixtures (A) used contain not only the customarily used diol components but also polysiloxane compounds having hydroxyalkyl end groups. The preferred compounds mentioned in the hereinbelow recited formula scheme are used in such a mixing ratio that the number of OH equivalents of these components relates to the number of OH equivalents of the other macrodiols as 0.2:99.8 to 30:70. Particular preference is given to a ratio of the number of OH equivalents within the range from 0.3:99.7 to 10:90.

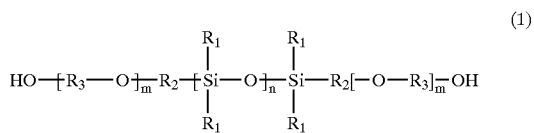
(1)

in the formula (1):

n is a number from 2–70

$R_1$ is a $(C_1–C_4)$-alkyl radical $R_2$ is a $(C_1–C_4)$-alkylene radical $R_3$ is a $(C_1–C_4)$-alkylene radical and m is a number from 0–6

The OH functionality of useful polysiloxane compounds may fall minimally short of the value of 2, but should ideally not exceed it. The average molecular weight of the siloxane macrodiols is preferably from 300–6000 g/mol. Particular suitability is possessed by compounds having a molecular weight of 1000–4000 g/mol and the following structural features: $R_1=CH_3$ and m=0.

The macrodiol mixture (A) is dominated in quantitative terms by known compounds which are customarily used in the production of thermoplastic polyurethanes or of elastic filaments from polyurethanes or poly(urethaneurea)s. These are recited for example in DE-A 28 32 352 or U.S. Pat. No. 3,719,708. Examples are polyester-diols, polyether-diols, polycarbonate-diols or polyacetal-diols having a molecular weight of 1000–8000 g/mol, preferably of 1000–6000 g/mol, particularly preferably of 1500–4000 g/mol. It is particularly suitable and therefore preferable to use polyester-diols and polyether-diols or mixtures thereof.

Examples of suitable polyester-diols are dicarboxylic acid polyesters of aliphatic dicarboxylic acids which may contain not only a plurality of diols but also a plurality of dicarboxylic acids or hydroxycarboxylic acids. Particular suitability is possessed by mixed polyesters formed from dicarboxylic acids which are comparatively long-chained, preferably containing six or more carbon atoms, such as sebacic acid, azelaic acid and preferably adipic acid, and 2 to 4 different diols which are preferably comparatively long-chained, particularly containing four or more carbon atoms. Particularly suitable diols for these polyesters are 1,6-hexanediol, 1,4-butanediol, 2,2-dimethyl- 1,3-propanediol and 3-methyl-1,5-pentanediol. Similarly, lactone-polyester-diols or mixed-polyester-diols based on ε-caprolactone and methyl-valerolactone are suitable for use as compounds for the components mixture (A).

Suitable long-chain polyether-diols are in particular polytetramethylene oxide diols or their copolyethers with other ether-forming compounds such as ethylene oxide or propylene oxide. It is also possible to use mixtures of the compounds mentioned.

The components mixture (B) comprises in particular the diisocyanate compounds which are typical in the synthesis of polyurethanes and to which are added comparatively small amounts of polyisocyanates whose NCO functionality has a value greater than 2. Suitable components are the isocyanurate-modified polyisocyanates known per se. Such diisocyanate-derived oligomers are described for example in Houben-Weyl "Methoden der organischen Chemie", volume E 20, "Makromolekulare Stoffe", Georg Thieme Verlag, Stuttgart, New York, 1987, on pages 1739 to 1748.

It is further also possible to use polyisocyanates based on oligomerization products having uretidione structural elements.

Alongside the oligomers derived from 2,4-toluene diisocyanate and its isomers and the oligomers derived from 4,4'-diphenylmethane diisocyanate and its isomers, the oligomers derived from aliphatic diisocyanates are particularly useful. Suitable oligomers of this type are oligomers derived from 1,6-hexamethylene diisocyanate and from isophorone diisocyanate.

However, it is also possible to use intermediate products having oxazolidinone and isocyanurate groups and formed for example according to EP 0 272 563 A2 by reaction of at least one organic polyisocyanate with an organic compound having epoxide groups. Advantageous products of this type are mentioned in EP-A 95 1 054 790.

The polyisocyanates mentioned are part of a mixture which contains larger amounts of common aromatic and/or (cyclo)aliphatic diisocyanates. These are described for example in Kunststoff-Handbuch, volume VII, edited by Oertel, Carl Hanser Verlag, Munich, 2nd edition, 1983, on pages 63–74. The following diisocyanates are particularly suitable for producing elastane yarn:

2,4-toluene diisocyanate and also the corresponding 2,4-/2,6-diisocyanate isomer mixtures and particularly 4,4'-diphenylmethane diisocyanate and corresponding isomer mixtures with minor amounts of 2,4'- and/or 2,2'-isomers. Particular preference is given to using pure 4,4'-diphenylmethane diisocyanate. It is possible of course to use mixtures of aromatic diisocyanates. It is further possible to use (cyclo)aliphatic diisocyanates as blending components or as individual components. Specific examples are 1,4-butane diisocyanate, 1,6-hexamethylene diisocyanate, 1,8-octamethylene diisocyanate, 1,4-cyclohexyl diisocyanate, 4,4'-dicyclohexyl-methane diisocyanate, tetramethylenexylylene diisocyanate and isophorone diisocyanate. The recited cycloaliphatic diisocyanates can be used in stereoisomerically pure form or as mixtures of stereoisomers.

The components of the isocyanurate mixture (B) are used in such amounts that the ratio of the NCO equivalents of the difunctional components to those of the more highly functional components is within the range from 99.5:0.5 to 80:20.

Component (C) comprises hydroxyalkyl-substituted compounds having an OH functionality of 2 and having a molecular weight of up to 400 g/mol. These diol compounds are known to act as chain extenders in the synthesis of thermoplastic polyurethanes. They can be added alone or in the form of a mixture. Examples of such diols are 1,2-ethanediol, 1,2- and 1,3-propanediol, 2,2-dimethyl-1,3-propanediol, 1,6-hexanediol, 3-methyl-1,5-pentanediol, 1,4-cyclohexanediol, 1,4-bis(2-hydroxyethoxybenzene) and bis(2-hydroxyethoxy)terephthalate. Preference is given to using 1,4-bis(2-hydroxyethoxybenzene) and 1,6-hexanediol, particularly preferably 1,4-butanediol, as chain extenders. In fractions of up to 5% by weight, based on component (d), it is optionally possible, as well as the diols, to use more highly functional polyols, for example trimethylolpropane, glycerol, 1,2,6-hexanetriol, trimethylolethane and pentaerythritol.

It is also possible to use the recited diol compounds together with the polysiloxanediols mentioned under (A), with the proviso that their OH functionality has a value of 2 and their molecular weight is 300–1500 g/mol.

It is further possible optionally also to use aliphatic amines, for example ethylenediamine, 1,4-tetramethylenediamine, hexamethylenediamine, isophorone-diamine, hydrazine and substituted hydrazines and aminoalcohols, for example ethanolamine, diethanolamine and 3-aminopropanol, as co-chain extenders in fractions of up to 10% by weight of the total amount of component (C).

In unison with the process of the invention it is optionally possible, as well as the chain extenders mentioned, to use, as so-called chain terminators, further compounds having groups which are monofunctional with regard to isocyanates. These include for example monoalcohols such as butanol, 2-ethylhexanol, octanol, dodecanol, the various amyl alcohols, cyclohexanol and ethylene glycol monomethyl ether and also monoamines, for example diethylamine, butyl- and dibutylamine, octylamine, stearylamine, methylstearylamine, pyrrolidine, piperidine and cyclohexylamine.

The additive substances mentioned under (D) comprise catalysts for polyurethane synthesis, stabilizers and also auxiliary and operational substances which are capable of improving the processing characteristics of the polyurethanes in melt form and of the elastic yarn produced therefrom.

Suitable catalysts, which catalyse especially the reaction between the NCO groups of the isocyanate compounds (B) and the hydroxyl groups of the formative components (A) and (C), are in particular the conventional and customary tertiary amines, for example triethylamine, N,N-dimethylcyclohexylamine, N-methylmorpholine, N,N'-dimethylpiperazine, 1,4-diazabicyclo[2,2,2]octane and the like and also especially organic metal compounds such as titanic esters, for example dibutyltitanium bis(acetylacetonate), iron compounds, tin compounds, for example tin(II) acetate, tin(II) octoate and tin(II) laurate or the tin dialkyl salts of aliphatic carboxylic acids such as dibutyltin dilaurate, dibutyltin diacetate, dioctyltin diacetate or the like. Catalysts are customarily used in amounts from 0.001% by weight to 0.1% by weight per 100 parts by weight of the mixture of polyhydroxy compounds (A) and the diols (C). In a particularly preferred embodiment of the process of the invention, no catalyst is used.

Not only the raw materials but also the polyurethane melt to be spun may have the stabilizers known in the field of the production of the elastane yarn additionally added. These are for example antioxidants, light stabilizers, UV absorbers and additives which can improve the chlorinated water fastness of the elastomeric yarn. Further optionally necessary additive substances are pigments, dyeing additives, brightening dyes and antistats. As auxiliary and operational substances there may be added in particular friction-reducing additives such as the magnesium, calcium, lithium, zinc and aluminium salts of long-chain carboxylic acids such as stearates, palmitates or dimer fatty acids or any mixtures of these salts, stearic acids, stearyl alcohol, stearic esters and stearamides and also fatty acid esters of pentaerythritol.

To obtain adequate mechanical properties for the elastic yarns produced by the process of the invention, for example high extensibility, low residual extension and good recovery, the starting materials (A), (B) and (C) are reacted in such a mixing ratio that the sum total of components (B)+(C) in the elastic yarns is 5–30% by weight based on the sum total of all components. This value, referred to as hard segment content, shall preferably be 15–30% by weight. Particular preference is given to a process which provides elastane fibre having values of 18–25% by weight.

To carry out the process of the invention, the raw materials (A), (B), (C) and (D) can, without addition of solvents, be reacted continuously, for example using multiple screws, to form a polyurethane. This is the simplest embodiment of a continuous process. However, the elastic yarns obtained from such reaction products occasionally do not possess the high grade mechanical and thermal properties known from elastanes, since the fibre-forming polyurethanes fall short of having the optimal segment structure. Compared with this one shot process, preference is given to reacting the components in multiple stages by the so-called prepolymer process.

In this process variant, components (A) and (B) are initially reacted to prepare an NCO-terminated prepolymer in which the number of the NCO equivalents of the components mixture (B) relates to the number of hydroxyl group equivalents of the components mixture (A) in the prepolymer especially as 1.1:1.0 to 6.0:1.0 and preferably 2.0:1.0 to 4.0:1.0. Reckoned on the basis of the residual isocyanate contents of the prepolymer, the conversion of the macrodiol components (A) should be 80–110% and preferably 90–105%.

The prepolymers thus prepared are according to the processes of the invention continuously reacted with the chain extender (C) to form the fibre-forming polyurethane melt.

However, the prepolymerization process is used to prepare in a plurality of steps, in a batchwise or continuous manner, from at least parts of components (A) and/or at least parts of components (B) a preproduct, the sum total of the NCO equivalents of the components from (B) relating to the number of OH equivalents of the components from (A) in the preproduct as 1.05:1 to 10:1, and this preproduct is then reacted in a continuous manner with the remaining fractions of components (A) and/or (B) and the remaining starting materials (C).

The prepolymers can be prepared discontinuously or continuously. A known discontinuous process is the batch procedure. In this procedure, the components (A) and (B) are intensively mixed and reacted in a stirred tank reactor in a single stage in the mixing ratios mentioned. However, kinetic control of the reaction is difficult on an industrially relevant scale, so that more or less pronounced quality variations arise, owing to insufficient reproducibility. In addition, the use lives desired for reliable further processing are not always achieved in the case of prepolymers produced in this manner.

The preparation of prepolymers therefore preferably takes place in continuous reactors in one or more stages. This has the advantages of a more constant reaction and of a better set of processing characteristics of the reaction melt and leads ultimately to more uniform and better yarn qualities. Suitable for continuous operation are reactors equipped with mixing and heating/cooling elements, which reactors can be used singly or in multiply parallel and consecutive form. The mixing of the components and the disbursing of the reaction mixture can take place not only statically but also dynamically. In addition, combinations of the aforementioned flow reactors with customary delay time tubes can also be used to better control the reaction and to adjust the desired prepolymer quality.

The reaction of the components (A) and (B) to make the prepolymer takes place in particular at a temperature of 70–150° C. in the course of an average residence time of 15–120 minutes.

A preferred process is characterized in that the preparation of the polyurethane melts by the prepolymerization process is effected continuously in all steps by generating from the components (A) and (B) or from fractions of the components (A) and (B) in a flow reactor equipped with mixing elements, or in a plurality of consecutive reactors of this type, and optionally combined with customary delay time tubes, at a temperature of 70–150° C. and an average residence time of 15–120 min, a prepolymer and reacting this prepolymer with the chain extender (C) and any remaining fractions of components (A) and (B) in a multiple screw equipped with mixing and kneading elements at temperatures of 80–270° C. and at average melt residence times of 0.5–15 min to form the polyurethane.

Such continuously produced preproducts are either after brief intermediate storage in a buffer vessel or in a preferred embodiment continuously reacted directly with the chain extender (C) and any remaining residual fractions of recipe components (A) and (B).

Suitable machines for carrying out the chain extension reaction are continuous kneaders and preferably screw reactors. Use is made in particular of multiple screws which through the particular arrangement of mixing, kneading and conveying elements can be adjusted to the particular conditions of the reaction. Such multiple screws are self-cleaning. It is sensible to precisely control the reaction by using machines constructed of a plurality of separately heat- and coolable enclosed parts and subdivided into intake zone (metered addition of the reaction components), reaction zones and extrusion zone.

In the practice of the preferred process of the invention, the prepolymer and the remaining components (C) and (D) are fed continuously into the screw machine either singly or partially mixed at the same position (preferably in the first enclosure) or at different positions. The auxiliary and additive substances (D), for example the customary spinning additives and stabilizers, are preferably not metered in upstream of the reaction zone. In the intake zone, the temperature is in particular 70° C. to 150° C., preferably 90° C. to 120° C.; in the reaction zone it is in particular 100° C. to 260° C., preferably 150° C. to 240° C., and in the extrusion zone it is in particular 150° C. to 270° C., preferably 190° C. to 240° C. The melt residence time in the screw machine is in particular 0.5 to 20 minutes, preferably 1 minute to 10 minutes, particularly preferably 1 minute to 5 minutes.

The reaction, consisting of prepolymer formation and chain extension, can preferably be conducted overall in such a way that the ratio of the isocyanate equivalents and the sum total of the Zerevitinov-active hydrogen equivalents of the components (A) and (C), prior to the reaction, is 1.00–1.15 and preferably 1.03–1.10.

It is advantageous for the specific reaction of the components to be followed by a devolatilization of the polyurethane melt produced. To this end, venting domes can be installed in pressure-relieved parts of the screw in the region of the extrusion zone.

At the downstream end of the screw the reaction screw is fed directly via an adaptor and distributor system to the spinning pumps and pressed by these, after passage through filtering means, into the jet blocks.

The spinning of the filaments is effected in particular at a temperature of 180° C. to 270° C., preferably at a jet temperature of 190–250° C. The filaments formed are cooled down, for example by quenching with air. The take-off speed of the filaments is in particular, depending on their fineness (linear density), from 100 m/min to 1000 m/min, preferably from 200 m/min to 800 m/min.

In a preferred process, the polyurethane melt, after the mixing in of lubricants and of stabilizers, is spun without further intermediate steps at a temperature of 180–250° C. into multiple ends at a speed of 200–1000 m/min.

The filaments are then for example continuously, i.e. without intermediate laydown, drawn. Preferably, the filaments are cooled, spin finished, drawn in a ratio within the range from 1.1:1 to 6:1 and subsequently, i.e. before wind-up, relaxed.

Particular preference is given to cold drawing at a temperature of 20–50° C. to a draw ratio of 1.05 to 5.0, preferably of 1.1–2.5. The filaments then pass through a relaxation zone and have a spin finish customary for elastanes applied to them, before being wound up at a speed of 200–1200 m/min, preferably 400–1000 m/min.

The process of the invention makes it possible to produce elastic yarns in monofil and multifil form. Preference is given to spinning monofilaments. Owing to the outstanding quality of the polyurethane melt produced and the consequent good spinnability, it is further possible to spin, aftertreat and wind even fine linear density yarn (of about 20 dtex) with very good spinning efficiencies in plural end form.

The wound yarn is then subjected especially to a thermal aftertreatment (tempering), especially at a temperature of 50–120° C., preferably of 60–100° C., for 1 hour to 96 hours, preferably for 16 hours to 48 hours. It is advantageous to subject the yarn to a variable tempering programme such that, starting at low temperatures, the stress is increased up to a maximum of, for example, 120° C. This tempering can be carried out not only in vacuo but also in air or inert gases; tempering in air is preferred.

The intensity of tempering depends on the basic chemical and physical structure of the yarn and on its fineness (linear density). The tempering conditions must be chosen in such a way that, following such a treatment, packages having adequate unwinding characteristics for further processing are present.

The elastic yarn provided by the process of the invention also forms part of the subject-matter of the invention and is characterized by a low residual extensibility of not more than 25%, preferably 5–25%, especially 5–20%, coupled with a simultaneously high ultimate tensile stress extension of not less than 400%, especially of 400–650% and preferably of 450–650%. The force/extension and hysteresis characteristics typical of conventional elastanes are observed. Tenacities >1.0 cN/dtex are obtained predominantly in the case of the preferred fibres. This is an essential prerequisite for the production of fine linear density yarn. The process of the invention readily provides fine linear density yarn down to monofilament of 20 dtex. Particularly preferred elastane yarn has a linear density of 20–50 dtex.

More particularly, the elastic filaments provided by the process of the invention possess high stability under thermal stress and plastic flow as reflected in an HDT (heat distortion temperature) value of above 185° C. and very particularly in a hot rupture time of not less than 5 s preferably not less than 15 s.

The elastic filaments are very useful alone or in combination yarns together with other filaments comprising for example polyamide, wool, cotton and polyester for processing into textile goods, for example by means of warp knitting, circular knitting and flat knitting. As well as for use in hosiery, the elastic yarn provided by the process of the invention is because of its high thermal stability particularly useful for application in fields which require a specific heat-settability, for example underwear, corsetry, sportswear, outerwear and cover fabrics.

The invention further provides for the use of the elastane yarn obtained by the process of the invention for producing combination yarns and textile sheet materials, such as consecutive course formation knits, wovens or synchronous course formation knits.

We claim:

1. Process for producing elastane yarn by reaction of:
(A) macrodiol mixtures comprising at least a linear polyester-, polyether- and/or polycarbonate-diols having a molecular weight of 1000–8000 g/mol (number average), and at least one hydroxyalkyl-terminated polysiloxane compound with
(B) isocyanate mixtures of diisocyanates and smaller fractions of aliphatically structured polyisocyanates having an average NCO functionality of greater than 2, and
(C) hydroxyalkyl-substituted diols having a molecular weight (number average) of up to 400 g/mol as chain extenders, alone or mixed, and optionally combined with low molecular weight polysiloxanes mentioned under (A)
and optionally in the presence of
(D) catalysts, stabilizers and further auxiliary and operational substances, spinning the resulting polyurethanes from the melt, spin finishing, drawing, relaxing then thermally aftertreating the yarn obtained, wherein the polyurethane synthesis is carried out using in the macrodiol mixture (A) at least one hydroxyalkyl-terminated polysiloxane compound having an OH functionality $\leq 2$ and a molecular weight of 300–6000 g/mol (number average) and the components of the macrodiol mixture (A) in such a mixing ratio that the number of the OH equivalents of the polysiloxane compounds relates to the number of the OH equivalents of the other macrodiols as 0.2:99.8 to 30:70, and wherein the components of the isocyanate mixture (B) are used in such amounts that the ratio of the isocyanate equivalents of the difunctional components to the higher functional components is within the range from 99.5:0.5 to 80:20, the reaction of the components (A), (B) and (C) is carried out continuously according to a one-step process or in two steps by the prepolymerization process with continuous chain extension reaction, the proportion of the components (B)+(C) in the elastic yarn, based on the sum total of the components (A)+(B)+(C), being 5–30% by weight, and wherein the resulting reaction melt is spun directly, optionally in the presence of stabilizers and lubricants or other auxiliaries (D).

2. Process according to claim 1, wherein the prepolymerization process is used to initially prepare from the components (A) and (B) an NCO-terminated prepolymer in a batchwise or continuous manner, the number of the NCO equivalents of the components (B) relating to the number of the OH equivalents of the components (A) in the preparation of the prepolymer being 1.1:1 to 6:1, and wherein this prepolymer is then reacted continuously with the chain extender (C) to form the polyurethane.

3. Process according to claim 1, wherein the prepolymerization process is used to prepare in a plurality of steps, in a batchwise or continuous manner, from at least parts of components (A) and at least parts of components (B) a preproduct, the sum total of the NCO equivalents of the components (B) relating to the number of OH equivalents of the components (A) in the preproduct as 1.05:1 to 10:1, and wherein this preproduct is then reacted in a continuous manner with the remaining fractions of components (A) and (B) and the remaining starting materials (C) to form the polyurethane.

4. Process according to claim 1, wherein the ratio of the isocyanate equivalents of the components (B) and the Zerevitinov-active hydrogen equivalents of the components (A) and (C), determined from the recipe quantities, is 1.00–1.15.

5. Process according to claim 1, wherein the preparation of the polyurethane melts by the prepolymerization process is effected continuously in all steps by generating from the components (A) and (B) or from fractions of the components (A) and (B) in a flow reactor equipped with mixing elements, or in the plurality of consecutive reactors of this type, and optionally combined with customary delay time tubes, at a temperature of 70–150° C. and an average residence time of 15–120 min, a prepolymer and reacting this prepolymer with the chain extender (C) and any remaining fractions of components (A) and (B) in a multiple screw equipped with mixing and kneading elements at temperatures of 80–270° C. and at average melt residence times of 0.5–15 min to form the polyurethane.

6. Process according to claim 1, wherein the polyurethane melt, after the mixing in of lubricants and of stabilizers, is spun without further intermediate steps at a temperature of 180–250° C. into multiple ends at a speed of 200–1000 m/min.

7. Process according to claim 1, wherein the yarn is cooled, spin finished, drawn in a ratio within the range from 1.1:1 to 6:1 and subsequently, before wind-up, relaxed.

8. Process according to claim 1, wherein the yarn—wound on bobbins—is subjected to a thermal aftertreatment at a temperature of 50–120° C. for 1 to 96 hours.

9. Process according to claim 1, wherein macrodiols (A) are polyester-, polyether- and/or polycarbonate-diols having molecular weights of 1000–6000 g/mol, in a mixture with hydroxyalkyl-terminated polysiloxane compounds having an OH functionality of 2 and molecular weights of 1000–4000 g/mol.

10. Process according to claim 1, wherein isocyanate compounds (B) are aromatic diisocyanates, optionally combined with smaller fractions of (cyclo)aliphatic diisocyanates, but in a mixture with aliphatically structured, isocyanurate-modified polyisocyanates and/or oligomers derived from (cyclo)aliphatic diisocyanates having an NCO functionality <2.

11. Process according to claim 1, wherein the chain extenders (C) are selected from the group consisting of 1,2-ethanediol, 1,2- and 1,3-propanediol, 1,4-butanediol, 2,2-dimethyl-1,3-propanediol, 1,6-hexanediol, 3-methyl-1,5-pentanediol, 1,4-cyclohexanediol, 1,4-bis(2-hydroxyethoxybenzene) and combinations thereof, optionally combined with hydroxyalkyl-terminated polysiloxanes having an OH functionality of 2 and molecular weights of 300–1500 g/mol.

12. Elastane yarn obtained from the process according to claim 1.

13. Elastane yarn according to claim 12 having a tenacity of >1.0 cN/dtex, an ultimate tensile stress extension of not less than 400% and a residual extensibility value of not more than 25%.

14. Elastane yarn according to claim 12 having a heat distortion temperature (HDT) value of at least 185° C. and a hot rupture time of not less than 10 sec.

15. Elastane yarn according to claim 12, wherein it has a linear density of 20–50 dtex.

16. Combination yarns or textile sheet materials selected from the group consisting of consecutive course formation knits, wovens and synchronous course formation knits comprising the elastane yarn of claim 12.

* * * * *

UNITED STATES PATENT AND TRADEMARK OFFICE
CERTIFICATE OF CORRECTION

PATENT NO. : 6,637,181 B1
DATED : October 28, 2003
INVENTOR(S) : Korte et al.

It is certified that error appears in the above-identified patent and that said Letters Patent is hereby corrected as shown below:

Column 10,
Line 53, "aftertreating" should read -- after treating --

Signed and Sealed this

Third Day of May, 2005

JON W. DUDAS
*Director of the United States Patent and Trademark Office*